US005194275A

United States Patent [19]

Greer

[11] Patent Number: 5,194,275

[45] Date of Patent: Mar. 16, 1993

[54] GRAIN PROCESSING APPARATUS

[75] Inventor: David G. Greer, Anoka, Minn.

[73] Assignee: AgriChem, Inc., Anoka, Minn.

[21] Appl. No.: 928,734

[22] Filed: Aug. 13, 1992

[51] Int. Cl.[5] .............................................. A23N 17/00

[52] U.S. Cl. .................................. 426/231; 99/487; 99/516; 99/536; 426/507

[58] Field of Search .................................. 99/485-487, 99/489, 516, 534, 536, 468, 471, 473, 483; 134/132; 426/231, 506, 507, 511, 454, 455

[56] References Cited

U.S. PATENT DOCUMENTS

| | | | |
|---|---|---|---|
| 3,148,971 | 9/1964 | Macdonald . | |
| 3,255,975 | 6/1966 | Malin et al. . | |
| 3,695,165 | 10/1972 | Sienkiewicz et al. | 99/471 |
| 3,697,286 | 10/1972 | Grun | 99/471 |
| 3,703,861 | 11/1972 | Slack et al. | 99/471 |
| 3,717,086 | 2/1973 | Hough | 99/471 |
| 3,932,736 | 1/1976 | Zarow et al. | 99/487 |
| 4,336,660 | 6/1982 | Strydom . | |
| 4,499,111 | 2/1985 | Oetiker et al. . | |
| 4,700,310 | 10/1987 | Volk, Jr. | 426/454 |
| 4,721,448 | 1/1988 | Irish et al. | 99/487 |
| 4,742,463 | 5/1988 | Volk, Jr. | 426/454 |
| 4,829,891 | 5/1989 | Satake | 99/516 |
| 4,898,092 | 2/1990 | Greer | 99/536 |
| 4,993,316 | 2/1991 | Greer | 99/487 |
| 4,994,286 | 2/1991 | Greer . | |

FOREIGN PATENT DOCUMENTS

| | | |
|---|---|---|
| 2065492 | 3/1970 | Fed. Rep. of Germany . |
| 2055059 | 2/1981 | United Kingdom . |
| Wo87/06434 | 11/1981 | World Int. Prop. O. . |

OTHER PUBLICATIONS

Boonton Polytechnic Company brochure entitled The Boonton Miltrol System from the Moisture Bulletin, vol. 1, Nov. 5, 1964.

Dickey-john brochure entitled Continuous Flow Moisture Monitor.

Process Automatic Systems brochure published by Agridustrial Electronics, Inc. (Subsidiary of Dickey-john Corp.) Jun. 1, 1983.

Instruction Manual for Dickey-john Continuous Flow Moisture Monitor.

Aug., 1971 *Milling Flour & Feed* magazine article entitled "Measurement and Control of Moisture in Cereals" pp. 8-11.

*Primary Examiner*—Timothy F. Simone

*Attorney, Agent, or Firm*—Burd, Bartz & Gutenkauf

[57] ABSTRACT

An apparatus and method of processing grain by raising the moisture content of the grain relative to a target level. As the grain is moved through a processing area, the moisture content and the mass flow of the grain are measured. Each measurement is converted to an electronic signal and the signals are fed to a programmable controller which blends the two signals and produces a single output control signal that is fed to a proportional control valve. The control valve acts responsive to the control signal to adjust the amount of moisture added to the grain at a wetting station. An additive such as a surfactant can be metered into the water supply.

18 Claims, 1 Drawing Sheet

GRAIN PROCESSING APPARATUS

BACKGROUND OF THE INVENTION

Grain processing facilities, such as a commercial livestock feed mill, typically have a central processing area and several bulk grain storage bins. Grain flows from these bins into the processing area either by gravity or through augers that draw grain from the bottoms of the bulk bins. In either case, the flow rate of the grain from the various sources is quite variable. It is not uncommon for there to be as much as 100 percent variation between the highest and lowest grain flow rates within a particular facility.

The first automated grain conditioning apparatus was designed to monitor and adjust the moisture content of a single grain entering a processing area, where the flow rate of the grain was assumed to be relatively constant. When more than one grain flow rate was encountered, various manual adjustments were made to control the signal to produce the desired result. This approach worked, but was entirely empirical, and produced a less than fully automated system. The apparatus had a capability to adjust the amount of moisture added to the incoming grain only according to changes in the moisture content of the grain. The apparatus had no capability to track and adjust for any changes in the mass flow rate. If an individual grain source changed flow rate after the initial calibration, or if there were variations in grain flow during operation, there was no automatic adjustment of the amount of moisture being added.

SUMMARY OF THE INVENTION

The invention relates to an apparatus for and method of processing granular material such as seed grain or feed grain to control the moisture content of the grain relative to a target level. One purpose of the apparatus is to condition grain by addition of moisture to raise the moisture content of the grain to the target level. Another purpose of the apparatus is to control the addition of moisture to grain so that the moisture content never exceeds the target level. As the grain is moved through a processing area, two control signals are generated. A continuous flow calibrated moisture sensor is positioned to receive and measure the moisture content of passing grain. The sensor is used to generate an electronic signal indicative of the grain moisture content as it passes through the sampling site. A second signal, indicative of the mass flow of the granular material, is generated by measuring a characteristic electric current being drawn under load by any one of several motors that can be used to convey the grain through or into the processing area. Such a motor will have "baseline" current draw being that which is required to operate the conveying device empty. As the mass flow of granular material through the conveying device increases, the electric current needed to run the motor increases proportionally. An electric load sensor associated with the motor measures this parameter and generates an electronic signal accordingly. The two electronic signals enter a programmable controlling device that blends or proportions the two signals in a predetermined ratio to produce a third signal used to control application rate of liquid to the grain. A moisture application apparatus controlled by the programmable controller is provided for regulated addition of moisture to the granular material. The added moisture may be in the form of steam, hot or cold water, or a water-additive mixture such as a water-surfactant mixture.

IN THE DRAWINGS

FIG. 1 is a schematic view of the grain processing apparatus of the invention partially fragmented for purposes of illustration; and FIG. 2 is a schematic of an alternative control system for the apparatus of FIG. 1.

DESCRIPTION OF A PREFERRED EMBODIMENT

Figure 1:
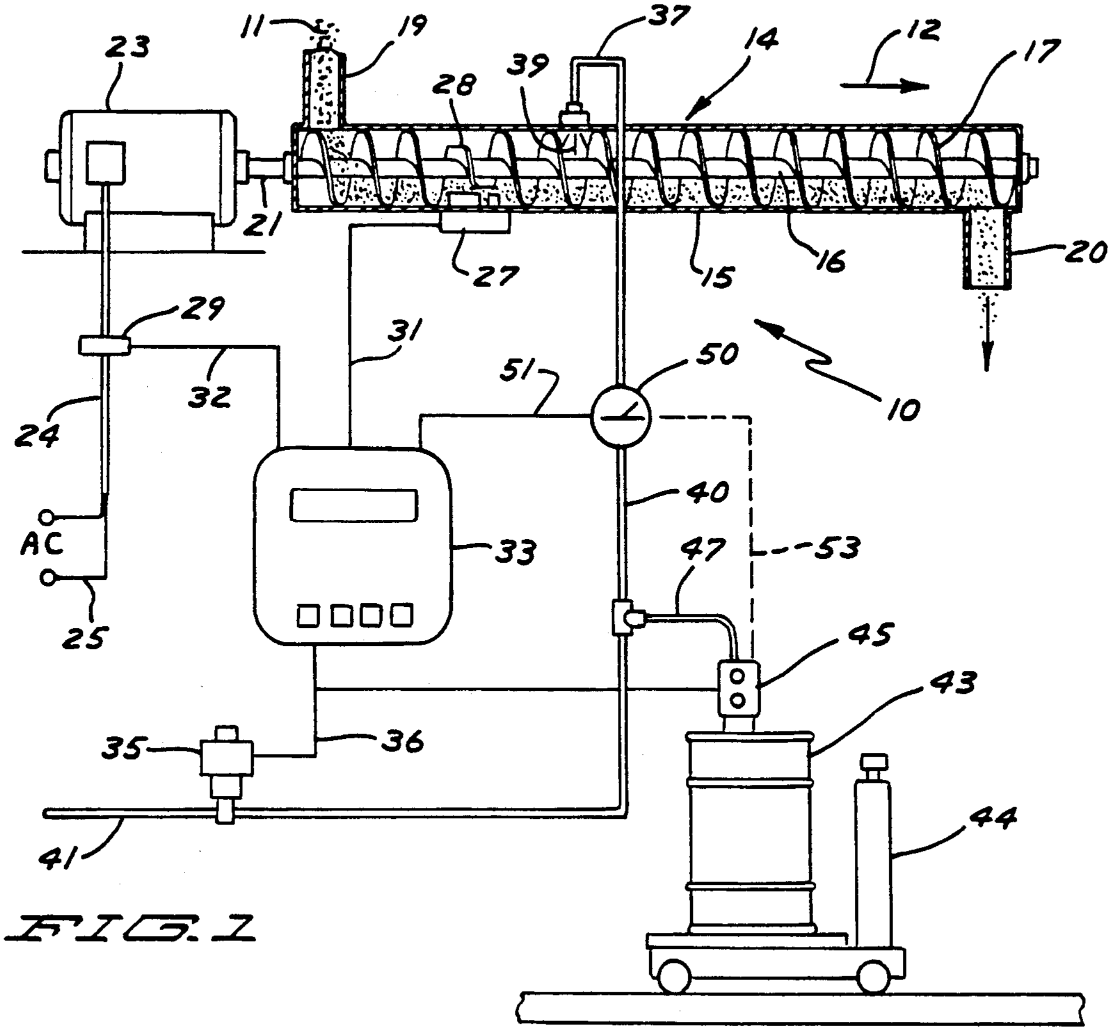

Referring to the drawings, there is shown in FIG. 1 a grain processing apparatus according to the invention indicated generally at 10 positioned to intercept a flowing grain 11 for the purpose of conditioning it through the addition of liquid comprised of either water alone or water mixed with an additive such as a nutrient, a surfactant or a flavoring agent. A purpose of adding the liquid to the grain is to bring the grain up to a uniform target moisture content. For example, it is desireable to bring feed grain up to a target moisture content to enhance the digestability of the feed to the animal as expressed with respect to the apparatus shown in U.S. Pat. No. 4,898,092 issued Feb. 6, 1990 to Greer and incorporated herein by reference. By way of further example, seed grain requires moisture for germination, preferably water mixed with a surfactant to enhance moisture penetration of the grain. It is desireable to bring the feed grain to a target moisture level only, as excess moisture will be wasteful of the surfactant as expressed with respect to the apparatus shown in U.S. Pat. No. 4,993,316 issued Feb. 19, 1991 to Greer and incorporated herein by reference. Grain as introduced to the apparatus 10 will be of varying moisture content. The grain that has been in storage will have a relatively low moisture content, while grain more recently harvested will usually have a somewhat higher moisture content. The grain conditioning apparatus 10 continuously senses and monitors the moisture content of the incoming grain and adjusts the amount of liquid added as required to bring the moisture content to the target level.

Another purpose of adding liquid to grain is the use of water as a solvent or carrier for an additive such as a flavor enhancer or mold inhibitor. Excessive addition of water can accelerate spoilage. In this situation the target moisture level effectively becomes an upper limit which can be approached but not exceeded.

Not only will the initial moisture content of grain 11 vary greatly, but the mass flow rate of grain introduced to the processing area will also vary. Grain 11 can be transported from a location of origin such as a storage bin, an elevator or a grain truck, so as to be travelling usually in a downstream direction of travel but at different mass flow rates according to location of origin.

Grain processing apparatus 10 includes grain conveyor means for moving the grain 11 in a downstream direction from an input location to a discharge location and comprising an auger assembly 14. Auger assembly 14 includes an auger housing 15 with a centrally located auger shaft 16. A helical auger flight 17 surrounds the auger shaft 16. An inlet chute 19 admits the grain at the upstream end of auger housing 15. An outlet chute 20 is located at the opposite end for discharge of processed grain.

The upstream end 21 of auger shaft 16 extends outwardly of the auger housing 15 and is connected to an electric motor 23. Electric motor 23 has an electric wire power cord 24 connected to an alternating current power source 25.

A capacitance type moisture sensor 27 is installed at a moisture sensing station in the auger housing 15 with a portion thereof extended into the interior of the auger in the path of travelling grain so as to be able to intercept a sample of the passing grain and continuously measure the moisture content thereof. Moisture sensor 27 is calibrated according to the type of grain being conditioned. The auger flight 17 is truncated as at 28 in order to provide clearance for the moisture sensor 27 in the interior of auger housing 15. Moisture sensor 27 provides a first control signal for control of application of liquid to the passing grain. While moisture 27 is shown located in the auger housing 15, it could be located elsewhere wherever it might be able to continuously sample a portion of passing grain for measurement of the moisture thereof. Moisture sensor 27 can be of the variety disclosed in U.S. Pat. No. 4,898,092.

A calibrated electric current load sensing device 29 is associated with the motor 23 to sense the amount of work being done by the motor 23. Load sensing device 29 can be connected in the power cord 24 of motor 23 in the fashion of a conventional ammeter or galvanometer. In one preferred embodiment, electric load sensing device includes a torus shaped sensor having cord 24 passing centrally through it so as to measure the strength of the electromagnetic field generated by the current flowing through the wire. The purpose of load sensing device 29 is to measure the mass flow of the grain passing through auger housing 15. The load sensing device 29 produces a mass flow signal by measuring the electric current being drawn under load by the motor 23. The motor 23 has a baseline current draw, meaning the electrical current required to operate the conveying device empty. As the mass flow of grain through the conveyor increases, the electric current (amperes) needed to run the motor also increases proportionally. The electric load sensing device 29 produces a second control signal for controlling the amount of liquid to be applied to the grain. While the control device 29 is shown also with respect to the auger motor 23, it could as well be associated with other motors characteristically encountered in the grain processing industry and used for conveying the grain through the processing apparatus such as a grain elevator, a mixing auger, a pit auger, a bin auger or the like.

The output signal of the moisture sensor 27 is carried through the moisture sensor control signal line 31. The output signal of the load sensing device 29 is carried through the load device signal line 32. Both of these lines lead to a electronic control module 33 where a programmable controlling device blends, or proportions the first and second signals according to a predetermined ratio to produce a third resultant signal. This third resultant or control signal is used to position a proportional flow control valve 35 through an output signal line 36.

Means for introduction of a liquid mixture to the grain includes a spray nozzle 37 for delivering a spray product 39 to the grain in auger housing 15. Spray nozzle 37 is mounted on auger housing 15 and communicates with the interior thereof at a wetting station located downstream of the sensing station. Spray nozzle 37 is connected to one end of and derives liquid product from a liquid product supply line 40. The opposite end of liquid supply line 40 is connected to the output side of the proportional flow control valve 35 which supplies water in regulated amount to the liquid line 40. The input side of proportional flow control valve is connected to a water supply line 41. Water supply line 41 is connected to a source of water under pressure as from a community water source or the like (not shown).

Liquid additive such as a surfactant is contained in a supply container 43 which rests on a commercial scale 44 for purposes of determining depletion thereof. An additive pump 45 is connected to the container 43 and derives additive from it for pumping through an additive supply line 47 which is connected to the liquid line 40. An additive pump control signal line 48 connects the additive pump 45 to the output line of the electronic control module 33.

In use, as grain flows into the mixing auger 14, the moisture sensor 27 generates a first electronic signal proportional to the moisture content of the grain. As the auger fills, more energy is required to turn the auger shaft than when the auger was empty. The current or load sensing device 29 generates a second electronic signal proportional to the mass flow of the grain. The load sensing device could also be used with the motor of another characteristic conveyance means feeding grain into the mixing auger, such as an elevator (leg), pit auger feeding the elevator or a bin auger moving grain from a storage bin into the process stream. Locating the load sensor on the mixing auger is generally preferred because of its immediacy to the point of treatment.

The moisture sensor is positioned to intercept a representative sample of the grain entering the processing stream. Other sensor designs and geometries available make it possible to intercept the grain sample in a variety of locations such as the spout bringing the grain to the mixing auger, or immediately below a grain cleaner or scalper, or at the top or bottom of an elevator.

The moisture and load output signals are fed into the electronic control module 33 where the programmable controlling device blends, or proportions the signals according to a predetermined ratio to provide the signal at the output line 36 that is used to position the proportional flow control valve. This signal also is used to control the additive pump 45 in order to meter the amount of additive being added to the liquid line 40 according to the amount of water flowing through the proportional control valve 35. An amount of resultant fluid is added to the grain regulated according to the moisture content of the grain and the mass flow of the grain. This fluid is throughly mixed with the grain through the action of the mixing auger.

In another configuration, there is provided a water flow meter 50 located in the liquid line 40 and having a water flow meter output signal line 51 connected to the electronic control module 33. Water flow meter device 50 is used in the event that the water pressure at the water input line 41 is variable whereby the output at the proportional flow control valve 35 at a given control signal would vary with fluxuating water pressure. The water meter 50 provides a signal indicative of the liquid flow through the pipe 40. The blended output signal at the electronic output line 36 is used as a target and the proportional flow control valve position is adjusted by the controller until the signal received from the water flow meter matches the proportioned signal.

If desired, in order to insure that the additive supplied to the liquid pipe 40 is proportionate to the supply of water, the additive pump can be controlled by the water meter 50. This is indicated by the phantom additive pump signal line 53 in FIG. 1.

Figure 2:
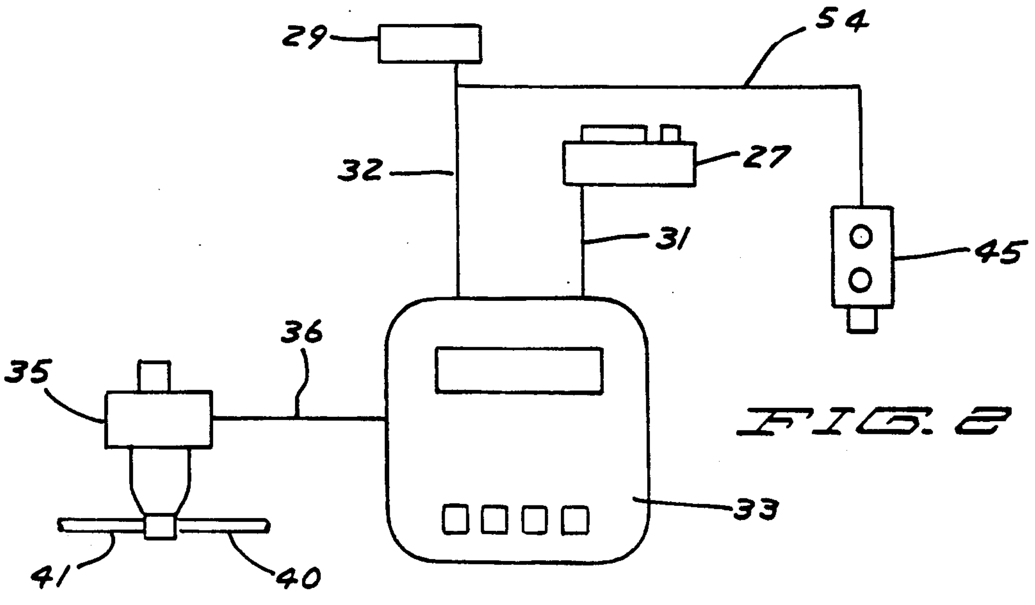

FIG. 2 depicts a scheme wherein the amount of additive supplied to the grain is proportioned to the mass flow. The load sensor 29 and moisture sensor 27 provide control signals through the respective control signal lines 32, 33 which are blended at the programmable controlling device 33 providing a result in control signal 36 which positions the proportional control valve 35. A load sensor signal line 54 provides the load sensor signal alone for control of the additive pump 45. The amount of additive will be regulated by mass flow of grain alone independent of the moisture content. This scheme is useful for the addition of substances requiring addition rates based on the total mass of grain processed and not moisture content, such as for the addition of mold inhibitors and micro-nutrients.

The embodiments of the invention of which an exclusive property or privelege is claimed are defined as follows:

1. A grain processing apparatus for processing of grain to an approximate target moisture content through the controlled addition of moisture derived at least in part from a water supply, as the grain moves in a downstream direction through a grain processing area from a first location toward a second location, comprising:

operated grain conveying means for moving grain in said downstream direction to and through the grain processing area, having a sensing station and a wetting station located downstream of the sensing station;

a moisture sensor of the type to continuously monitor moisture content of grain and convert the measurement into a first electronic signal, positioned at the sensing station located to intercept a sample of passing grain for substantially continuous measurement of the moisture content of the sample and translation of the measurement into said first electronic signal;

an electric current sensor associated with the grain conveying means of the type to continuously measure the electric current drawn by the grain conveying means and convert the measurement into a second electronic signal;

liquid applicator means located at the wetting station positioned to disburse liquid derived at least in part from a water supply upon passing grain;

a liquid supply line connected to the liquid applicator means for connection to the water supply;

a proportional flow control valve located in the liquid supply line having an electronically actuated valve control moveable between relatively open and relatively closed positions to regulate the amount of liquid flow to the liquid applicator means for application to passing grain;

a programmable controller;

means connecting the moisture sensor and electric current sensor to the programmable controller for receipt of the first and second electronic signals;

said programmable controller having means for blending the first and second electronic signals and creating a resultant output control signal, means connecting the programmable controller to the proportional flow control valve so that the valve control operates responsive to the output control signal according to the difference between the moisture content of the grain sample and the target moisture content.

2. The grain processing apparatus of claim 1 wherein: said grain conveying means includes a mixing auger and an electric motor to drive the auger.

3. The grain processing apparatus of claim 2 wherein: said electric current sensor is associated with a power cord to the auger motor to sense electric loading on the auger motor proportionate to mass flow of grain being conveyed.

4. The grain processing apparatus of claim 3 including:

a supply means to supply liquid additive for mixture with the water for application to the grain, means connecting the additive supply means to the liquid supply line for mixture of additive and water prepatory to application to the grain.

5. The grain processing apparatus of claim 4 wherein: said additive supply means includes an additive supply container, an additive pump connected to the additive supply container, and an additive supply line connected between the additive pump and the liquid supply line to supply additive in regulated amounts to the liquid supply line for mixing with the water prepatory to application to the grain.

6. The grain processing apparatus of claim 5 including:

means connecting the additive pump to the programmable controller so that supply of additive is controlled by the output signal.

7. The grain processing apparatus of claim 5 including:

means connecting the additive pump to the electronic load sensor so that the supply of additive is controlled by the second electronic signal.

8. A grain processing apparatus for processing of grain relative to an approximate target moisture content through the controlled addition of moisture derived at least in part from a water supply, as the grain moves in a downstream direction through a grain processing area from a first location toward a second location, comprising:

electrically operated grain conveying means for moving grain in said downstream direction to and through the grain processing area, having a sensing station and a wetting station located downstream of the sensing station;

a moisture sensor of the type to continuously monitor moisture content of grain and convert the measurement into a first electronic signal, positioned at the sensing station located to intercept a sample of passing grain for substantially continuous measurement of the moisture content of the sample and translation of the measurement into said first electronic signal;

an electric current sensor associated with the grain conveying means of the type to continuously measure the electric current drawn by the grain conveying means and convert the measurement into a second electronic signal;

liquid applicator means located at the wetting station positioned to disburse liquid derived at least in part from a water supply upon passing grain;

a liquid supply line connected to the liquid applicator means for connection to the water supply;

a proportional flow control valve located in the liquid supply line having an electronically actuated valve control moveable between relatively open and relatively closed positions to regulate the amount of liquid flow to the liquid applicator means for application to passing grain;

a programmable controller;

means connecting the moisture sensor and electric current sensor to the programmable controller for receipt of the first and second electronic signals;

a water flow meter located in the liquid supply line to measure the flow of liquid and produce an electronic signal proportionate to the flow of liquid;

said programmable controller having means for blending the first and second electronic signals and creating a resultant output control signal, and means for comparing the resultant output signal with the electronic signal from the water flow meter;

means connecting the programmable controller to the proportional control valve so that the valve control is operated responsive to the comparison between the output control signal and the water flow meter signal.

9. The grain processing apparatus of claim 8 wherein:

said grain conveying means includes a mixing auger and an electric motor to drive the auger.

10. The grain processing apparatus of claim 9 wherein:

said electric current sensor is associated with a power cord to the auger motor to sense electric loading on the auger motor proportionate to mass flow of grain being conveyed.

11. The grain processing apparatus of claim 10 including:

a supply means to supply liquid additive for mixture with the water for application to the grain, means connecting the additive supply means to the liquid supply line for mixture of additive and water prepatory to application to the grain.

12. The grain processing apparatus of claim 11 wherein:

said additive supply means includes an additive supply container, and additive pump connected to the additive supply container, and an additive supply line connected between the additive pump and the liquid supply line to supply additive in regulated amounts to the liquid supply line for mixing with the water prepatory to application to the grain.

13. The grain processing apparatus of claim 12 including:

means connecting the additive pump to the programmable controller so that supply of additive is controlled by the output signal.

14. The grain processing apparatus of claim 12 including:

means connecting the additive pump to the electronic load sensor so that the supply of additive is controlled by the second electronic signal.

15. The grain processing apparatus of claim 12 including:

means connecting the additive pump to the water flow meter so that the supply of additive is controlled according to the liquid flow in the liquid supply line.

16. A method of processing grain as it is moved through a grain processing area from an upstream location along a path toward a downstream location, through regulated addition of moisture derived at least in part from a water supply, in order to regulate the moisture content of the grain relative to an approximate target moisture content, comprising the steps of:

providing a moisture sensor specifically calibrated to measure moisture content of the type of grain to be conditioned and adapted to generate a first electronic signal proportional to the moisture content moving the grain on electrically operated conveying means;

measuring the moisture content of a sample of the moving grain at a first station on the path of travel of the grain, using the moisture sensor to substantially continuously monitor the moisture content of moving grain and translate the measurement into a substantially continuously generated first electronic signal;

providing an electric current sensor to measure the electric current drawn by the grain conveying means adapted to generate a second electronic signal proportioned to the mass flow of the grain;

measuring the mass flow of the grain using the electric current sensor to continuously measure the electric current drawn by the grain conveying means and translate the measurement into a substantially continuously generated second electronic signal;

providing a programmable controller and connecting the moisture sensor and electric current sensor to the programmable controller for receipt of the first and second electronic signals and blending of the signals to produce an output control signal;

providing moisture to the passing grain using a liquid applicator apparatus at a second station located downstream of the first station with respect to the direction of grain movement;

providing liquid to the liquid applicator apparatus through a liquid line extended from a water supply;

providing a proportional flow control valve in the liquid line of the type having an electronic valve control for regulating the opening and closing of the valve to regulate water flow through the valve by an electronic signal;

controlling the valve control of the automatic valve with the output control signal generated by the programmable controller to modulate the flow of water to the liquid applicator apparatus.

17. The method of processing grain of claim 16 including: amount according to the volumetric flow of water in the liquid line.

18. The method of processing grain of claim 17 including:

providing an auger assembly of the type having an auger housing and an auger located in the auger housing for movement of the grain along at least a portion of the path of movement of the grain from the first location toward the second location, said auger of the type being operated by an electric motor, said electric current sensor associated with said motor.

* * * * *

UNITED STATES PATENT AND TRADEMARK OFFICE
CERTIFICATE OF CORRECTION

PATENT NO. : 5,194,275

DATED : March 16, 1993

INVENTOR(S) : DAVID G. GREER

It is certified that error appears in the above-identified patent and that said Letters Patent is hereby corrected as shown below:

Col. 5, line 28 before "operated" insert ---electrically---.

Col. 8, line 52 before "amount" insert ---introducing a liquid additive into the liquid line in an---.

Signed and Sealed this

Thirtieth Day of November, 1993

Attest:

BRUCE LEHMAN

*Attesting Officer*

*Commissioner of Patents and Trademarks*